United States Patent [19]

Enomoto et al.

[11] 4,203,955
[45] May 20, 1980

[54] PROCESS OF PREPARING CALCIUM HYDROGEN PHOSPHATE ANHYDRIDE SUITABLE AS MATERIAL FOR PHOSPHORS

[75] Inventors: Takamitsu Enomoto; Kyōji Tanaka, both of Ube; Hiromi Kawamoto, Onoda; Tamotsu Mizuno; Masao Fujinaga, both of Ube, all of Japan

[73] Assignee: Central Glass Company, Limited, Ube, Japan

[21] Appl. No.: 931,902

[22] Filed: Aug. 8, 1978

[30] Foreign Application Priority Data

Aug. 9, 1977 [JP] Japan .................. 52/94672
Aug. 9, 1977 [JP] Japan .................. 52/94673

[51] Int. Cl.$^2$ ............................. C01B 25/32
[52] U.S. Cl. ............................. 423/308
[58] Field of Search ........................ 423/308

[56] References Cited

U.S. PATENT DOCUMENTS

| 3,095,269 | 6/1963 | Chiola et al. | 423/308 |
| 3,420,625 | 1/1969 | Margolis | 423/308 |
| 3,927,180 | 12/1975 | Chenot | 423/308 |
| 3,940,343 | 2/1976 | Demarest et al. | 423/308 |
| 4,044,105 | 8/1977 | Enomoto et al. | 423/308 |

Primary Examiner—O. R. Vertiz
Assistant Examiner—Wayne A. Langel
Attorney, Agent, or Firm—Fleit & Jacobson

[57] ABSTRACT

A process of preparing calcium hydrogen phosphate anhydride suitable as a raw material for phosphate phosphors, wherein $CaHPO_4.2H_2O$ is precipitated by mixing aqueous solutions of $NaNH_4HPO_4.4H_2O$ and $CaCl_2.6H_2O$ at 5°–40° C. An entire quantity of $CaHPO_4.2H_2O$ to be converted to $CaHPO_4$ in one batch is put into an acidified water maintained above 80° C. all at once. Crystalline $CaHPO_4$ is obtained through agitation of a resultant hot slurry for a few minutes. Crystal habit of the product depends on the pH of the hot water: lozenge-shaped plates when the pH is below 3.4, parallelogram plates in the pH range of 3.4–4.4, and square or rectangular plates when the pH is above 4.4. The particle size of $CaHPO_4$ depends on the water temperature and the degree of agitation. To precipitate $CaHPO_4.2H_2O$ in the presence of suitable quantity of seed crystals is effective for minimizing the Na content of $CaHPO_4$.

5 Claims, 19 Drawing Figures

PROCESS OF PREPARING CALCIUM HYDROGEN PHOSPHATE ANHYDRIDE SUITABLE AS MATERIAL FOR PHOSPHORS

BACKGROUND OF THE INVENTION

This invention relates to a process of preparing crystalline calcium hydrogen phosphate anhydride suitable as a raw material for phosphate phosphors.

Calcium hydrogen phosphate anhydride $CaHPO_4$ is an important material for phosphate phosphors used in fluorescent lamps such as calcium halophosphate phosphors represented by the general formula $Ca_5(PO_4)_3(Cl,F):Sb,Mn$. Such phosphors need to be produced in high purity and with strict control of particle shape, particle size and size distribution since these factors affect fluoresecent characteristics of the produced phosphors and workability of the phosphors in phosphor coating operations during production of fluorescent lamps. Accordingly calcium hydrogen phosphate anhydride as the raw material is required to be almost free of impurities such as $SO_4$, Na, Fe, Cl, etc. Furthermore, various standards have been established by the manufactures of phosphate phosphors for crystal shape, particle size, size distribution and Ca/P mole ratio of the anhydrous phosphate.

Calcium hydrogen phosphate anhydride is obtained by the dehydration of calcium hydrogen phosphate dihydrate $CaHPO_4.2H_2O$. In a conventional process, the phosphate dihydrate to be converted to the anhydride for use in the production of phosphate phosphors is prepared by a reaction of a refined and, hence, costly phosphoric acid with a refined calcium salt at a temperature near room temperature. The precipitated phosphate dihydrate is dispersed in water either together with the mother liquor or after separation from the mother liquor, and the resultant slurry is heated to 70°–100° C. to cause the conversion of the phosphate dihydrate to the anhydride. Alternatively, the precipitated phosphate dihydrate is separated from the mother liquor and heat-dried at 100° C. or above until completion of the conversion of the dihydrate to the anhydride. In another conventional process, calcium hydrogen phosphate dihydrate is precipitated by reaction of diammonium phosphate with calcium chloride, and the conversion of the precipitated phosphate dihydrate to the phosphate anhydride is accomplished by maintaining a slurry of the dihydrate in a heated state for a sufficiently long period of time with precise control of the temperature. However, calcium hydrogen phosphate anhydride prepared by any of these conventional processes is not fully satisfactory in its purity, crystal shape and particle size as a material for phosphors. Besides, these conventional processes are rather unfavorable from an economical viewpoint.

U.S. Pat. No. 4,044,105 shows a process of preparing high purity calcium hydrogen phosphate anhydride in the form of platy and square-shaped crystals of a desirable particle size (as a material for phosphors). In this process, the phosphate dihydrate is prepared by reaction of sodium ammonium hydrogenphosphate $NaNH_4HPO_4.4H_2O$ with calcium chloride in an aqueous phase and is dispersed in water to give a 5–20% slurry. After adjustment of the pH of the slurry to 4.5–5.5, the slurry is rapidly heated to 85°–97° C. by contact with steam to cause conversion of the phosphate dihydrate to the anhydride. However, in some cases the product of this process may be still unsatisfactory in its Na or Fe content, and it is impossible to obtain lozenge-shaped crystals of the phosphate anhydride with a Ca/P mole ratio below 1.01 by this process despite an existing demand for the phosphate anhydride of such a quality.

SUMMARY OF THE INVENTION

It is an object of the present invention to provide an improved process for the preparation of high purity calcium hydrogen phosphate anhydride crystals suitable as a raw material for phosphate phosphors with controlled shape and size of the phosphate anhydride crystals.

It is another object of the invention to provide an improved process for the preparation of high purity calcium hydrogen phosphate anhydride, which process can give platy and lozenge-shaped crystals of the phosphate anhydride in particle sizes desired by the manufactures of phosphate phosphors.

It is still another object of the invention to provide an improved process for the preparation of crystalline calcium hydrogen phosphate anhydride, which process utilizes as starting materials sodium ammonium hydrogenphosphate and calcium chloride both of commercial grade but gives crystalline calcium hydrogen phosphate anhydride suitable in particle shape and size as a raw material for phosphate phosphors and exceedingly small in the amounts of impurities, particularly in the amounts of Fe and Na.

In a process according to the invention, crystalline calcium hydrogen phosphate dihydrate is prepared by reaction between sodium ammonium hydrogen phosphate and calcium chloride in an aqueous phase and is separated from mother liquor. After usual washing, a batch of the calcium hydrogen phosphate dihydrate is put into an acidified hot water, which contains a mineral acid such as nitric acid, phosphoric acid or hydrochloric acid to adjust pH to a value within the range of 1.0 and 5.0 and is maintained at a temperature above 80° C., all at once so as to give a hot aqueous slurry in which the phosphate dihydrate concentration is below 40% by weight. The conversion of the phosphate dihydrate to calcium hydrogen phosphate anhydride is accomplished by continuously agitating the slurry.

In this process, the shape of the anhydrous calcium hydrogen phosphate crystals is determined primarily by the pH of the acidified hot water. Platy and rectangular or square crystals are obtained when the pH is above 4.4. Platy and parallelogram-shaped crystals are obtained in the pH range of 4.4–3.4. Platy and lozenge-shaped crystals are obtained by making the pH below 3.4. The particle size of the product can be controlled by varying the temperature of the acidified water and/or the rate of agitation of the slurry.

To reduce the Fe content of the product, the above summarized process of the invention preferably includes a preparatory step for the removal of Fe from the starting materials. In this step, a soluble calcium salt is added to an aqueous solution of sodium ammonium hydrogenphosphate in such an amount that the Ca/P mole ratio in the resultant solution becomes 0.01–0.1 to cause precipitation of calcium hydrogen phosphate thereby to cause a substantial portion of Fe in the solution to be carried off by the precipitate, and a soluble phosphate is added to an aqueous solution of calcium chloride with the same object in such an amount that the P/Ca mole ratio in the resultant solution becomes 0.005–0.05. To minimize the Na content of the product, it is preferable that calcium hydrogen phosphate dihydrate is prepared by mixing an aqueous solution of sodium ammonium hydrogenphosphate (refined by the above technique) containing less than 50 g/l of $P_2O_5$ with an aqueous solution of calcium chloride (refined by the above technique) containing less than 70 g/l of $CaCl_2$ with the addition of crystalline calcium hydrogen phosphate dihydrate as seed crystals in an amount corresponding to 5–30% by weight of the phosphate dihydrate to be formed by reaction between the two solutions. The preparation of the phosphate dihydrate is performed preferably at temperatures between 5° C. and 40° C.

DESCRIPTION OF PREFERRED EMBODIMENTS

A process according to the invention comprises the preparation of calcium hydrogen phosphate dihydrate and conversion (dehydration) of the phosphate dihydrate to the phosphate anhydride. Starting materials for the preparation of the phosphate dihydrate are limited, mainly from economic reasons, to sodium ammonium hydrogenphosphate (will be abbreviated to SAP) which is usually obtained from wet process phosphoric acid of industrial grade and commercially available calcium chloride which is obtained, for example, as a by-product in the production of soda ash.

Preparatorily to the preparation of calcium hydrogen phosphate dihydrate, SAP is subjected to usual filtration and recrystallization of procedures to remove major impurities. To meet a desire that the end product, i.e. calcium hydrogen phosphate anhydride, be sufficiently small in Fe content, it is preferable to remove Fe from the starting materials as much as possible.

In the present invention almost thorough removal of Fe from SAP is achieved by dissolving the filtered and recrystallized SAP in water to give a considerably concentrated solution such as an about 20% solution and adding a small amount of water soluble salt of calcium such as calcium chloride to this SAP solution to cause precipitation of a small quantity of calcium hydrogen phosphate from the solution. Then a large portion of Fe contained in SAP transfers into the precipitated phosphate crystals through occlusion, adsorption and/or coprecipitation. The precipitate is removed from the solution. The amount of the calcium salt added to the SAP solution should be controlled such that the Ca/P mole ratio in the resultant solution becomes 0.01 to about 0.10. The precipitation of the calcium phosphate and hence the removal of Fe from the solution remain insufficient if the Ca/P mole ratio does not reach 0.01. The removal of Fe from SAP nears completeness as the amount of the added calcium salt increases, but the addition of such a large amount of calcium salt as makes the Ca/P mole ratio above 0.10 results in the consumption of an unnecessarily large amount of SAP. When, for example, Fe content of the recrystallized SAP is about 1.5 ppm it is possible by this procedure to reduce the Fe content to about 0.2 ppm (on the dry basis).

On the same principle, an effective removal of Fe from calcium chloride obtained in the soda ash industry is accomplished by dissolving calcium chloride in water to give a considerably concentrated solution such as an about 40% solution and adding a solution phosphate such as SAP to the solution in such an amount that the P/Ca mole ratio of the resultant solution becomes 0.005 to about 0.05. Then a small quantity of calcium hydrogen phosphate precipitates from the solution, and not only Fe but also sulfuric acid radical contained in calcium chloride are carried off by the precipitate. Accordingly a refined calcium chloride can be obtained by separating this precipitate from the solution. For example, the Fe content of calcium chloride is reduced from about 30 ppm to less than 0.1 ppm (on the dry basis) accompanied with reduction of the $SO_4$ content from about 300 ppm to less than 30 ppm.

Also it is possible to remove Fe from the calcium chloride solution by the addition of sodium carbonate to precipitate calcium carbonate with adsorption of Fe, but this method is unfavorable because of a relatively large loss of calcium chloride.

After separation of the Fe-containing precipitate, the SAP solution is diluted with water to make the concentration on the basis of $P_2O_5$ below 50 g/l. The refined calcium chloride solution too is diluted with water until the concentration on the basis of $CaCl_2$ becomes below 70 g/l. Then the SAP solution is mixed with the calcium chloride solution, with agitation, to cause precipitation of crystalline calcium hydrogen phosphate by a reaction represented by the following equation:

$$NaNH_4HPO_4 + CaCl_2 + 2H_2O$$
$$\rightarrow CaHPO_4 \cdot 2H_2O + NH_4Cl + NaCl$$

The mixing of the SAP solution with the calcium chloride solution is carried out usually at temperatures between 5° C. and 40° C. at such a mixing ratio that the Ca/P mole ratio of the reaction system is about 1.10. Preferably the mixing is effected by first charging the calcium chloride solution in a reaction vessel and then introducing the SAP solution into the reaction vessel in the form of shower through a nozzle or nozzles. The agitation is continued for about one to several hours after completion of the introduction of the SAP solution. Thereafter the precipitated phosphate dihydrate is separated from the mother liquor and washed with water.

As an essential feature of a process according to the invention, the conversion (dehydration) of the phosphate dihydrate thus prepared to the phosphate anhydride is accomplished by putting a batch of the phosphate dihydrate (an entire quantity of the phosphate dihydrate to be treated in a batch) into an acidified hot water all at once so as to give a hot aqueous slurry. The acidified water is prepared by the use of a mineral acid, which is preferably nitric acid, phosphoric acid or hydrochloric acid, so as to establish a pH value chosen within the range from 1.0 to 5.0 and heated to a temperature above 80° C. at which the introduction of the phosphate dihydrate is intended.

As mentioned hereinbefore, the crystal shape of calcium hydrogen phosphate anhydride obtained by a process of the invention is determined by the pH of this hot water. If it is desired to obtain platy and square or rectangular crystals of the phosphate anhydride, the desire can be met by making the pH of the hot water above 4.4. In this case the conversion of the phosphate dihydrate to the anhydride proceeds through the formation of a gel phase, and the Ca/P mole ratio of the phosphate anhydride becomes relatively high, i.e. above 1.025. The pH of the hot water should be between 4.4 and 3.4 to obtain platy and parallelogram-shaped crystals of the phosphate anhydride. In this case the conversion or dehydration occurs without formation of a gel phase. The Ca/P mole ratio of the product lowers as the pH is lowered and becomes 1.01 when the pH is 3.4. By making the pH of the hot water below 3.4, it is possible to obtain platy and lozenge or diamond-shaped crystals of the phosphate anhydride. In this case, too, the conversion does not involve any gel-formation stage, and the Ca/P mole ratio of the phosphate anhydride becomes below 1.01. When, for example, use is made of nitric acid for the preparation of the acidified water, the pH becomes 4.4 by the addition of about 1 g/l of acid to water and 3.4 by increasing the amount of the acid to about 10 g/l.

It is a great advantage of the process of the invention that platy and diamond-shaped crystals of calcium hydrogen phosphate anhydride can be obtained easily and reproducibly with a Ca/P mole ratio below 1.01 because the phosphate anhydride of such quality is frequently required by the manufactures of phosphate phosphors but is not easy to prepare industrially by conventional processes. The Ca/P mole ratio of the phosphate may be lowered also by the addition of EDTA or the like thereby to dissolve out calcium as a chelete compound, but from an economical viewpoint such a method is unfavorable because of the consumption of a large quantity of EDTA to lower the Ca/P mole ratio below 1.01.

In a process according to the invention, particle size of the product, $CaHPO_4$, can be controlled by varying the temperature of the acidified water and/or the length of agitation time for the dehydration of $CaHPO_4.2H_2O$. The particle size becomes smaller as the water temperature or conversion temperature is raised and also as the agitation time is prolonged.

Figure 1:
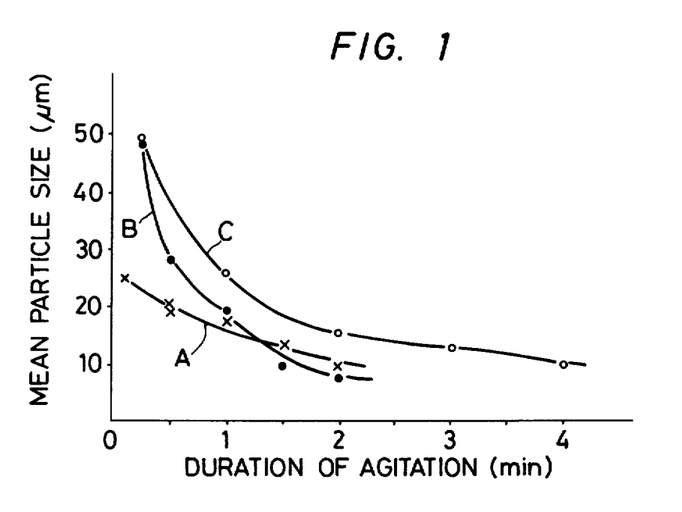
FIGS. 1 and 2 are graphs showing variations in particle size of anhydrous calcium hydrogen phosphate depending on dehydration conditions in a process according to the invention.

FIG. 1 shows the result of an experiment regarding the relation between the agitation time and mean particle size of the obtained anhydride crystals. Curve A (plotted by cross marks) represents a case where the conversion of the dihydrate to the anhydride was effected at 95° C. by the use of a hot acidified water containing 0.9 g/l of $HNO_3$ to give a pH value of 4.5 and the agitation after one-shot addition of the dihydrate to the hot acidified water was conducted at a constant rate of 350 rpm (revolutions of a stirrer). In this case the dihydrate was converted to the anhydride through formation of a gel phase. Curve B (plotted by black circles) represents a case where the rate of agitation was also 350 rpm but the conversion was effected at a temperature of 83° C. by the use of 25 g/l of $HNO_3$ to adjust the pH of the water to 2.8. Curve C (plotted by white circles) represents a case where the conversion temperature and the acidified water were the same as in the case of curve B but the agitation rate was 240 rpm. Both in the cases of curves B and C, the dihydrate was converted to the anhydride without forming a gel phase.

Figure 2:
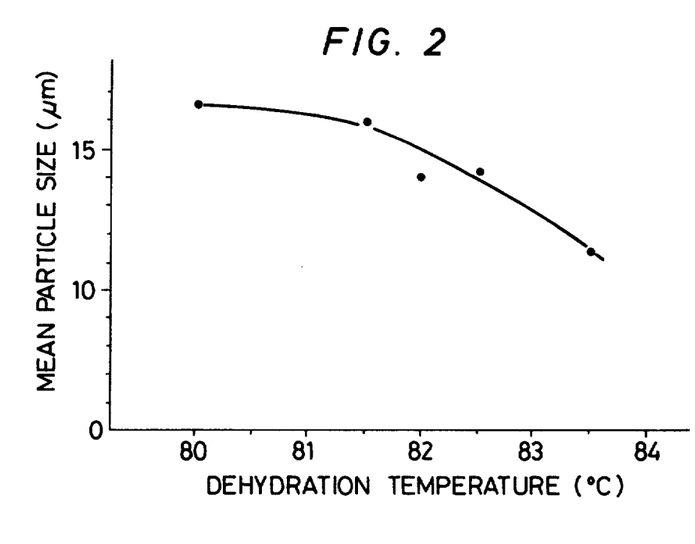

FIG. 2 shows the result of an experiment regarding the relation between the conversion temperature and mean particle size of the obtained phosphate anhydride crystals. The experiment was carried out by the use of a hot acidified water containing 18.5 g/l of $HNO_3$ to have a pH value of 3.0 and continuing the agitation for 15 min at a constant rate of 350 rpm. This graph shows that the dependence of the particle size on the conversion temperature, or the temperature of the acidified water, becomes more significant as the temperature is raised.

As demonstrated by these experimental results, mean particle size of $CaHPO_4$ crystals prepared by a process of the invention, characterized by one-shot addition of the phosphate dihydrate to a hot acidified water the pH of which is adjusted according to a desired shape of the anhydride crystals, can be easily controlled over a wide range from about 10 $\mu$m to about 50 $\mu$m.

Figure 3:
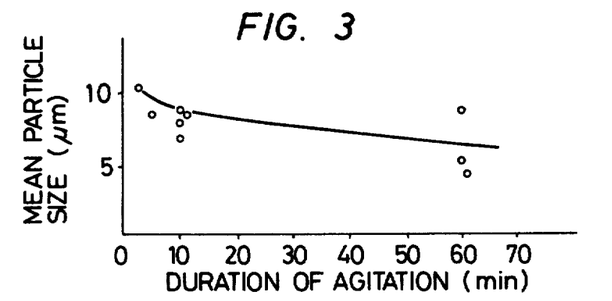
FIGS. 3–5 are graphs showing variations in particle size of anhydrous calcium hydrogen phosphate depending on dehydration conditions in processes not in accordance with the invention.
Figures 4, 5:
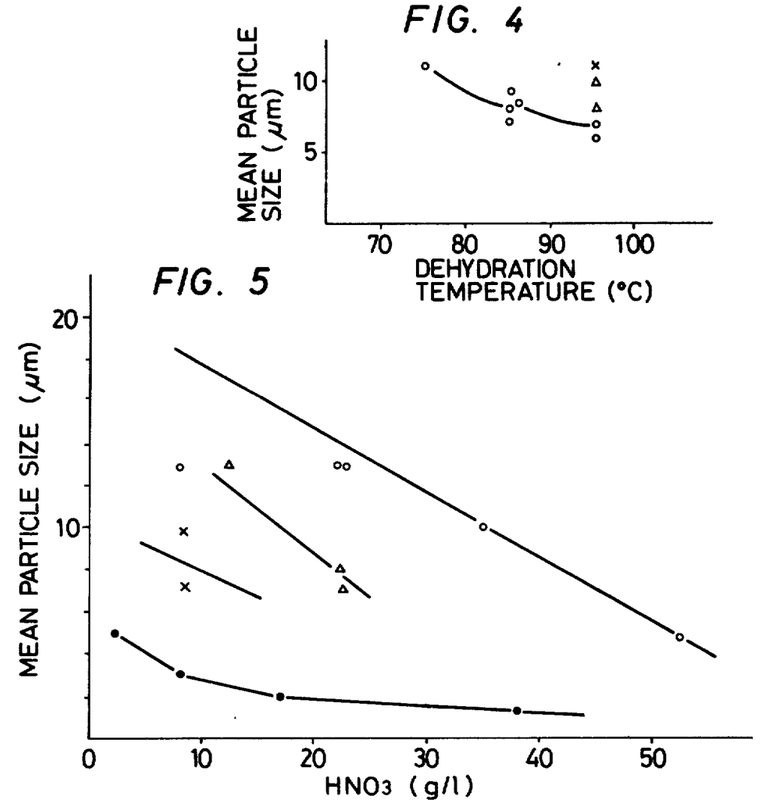

In some of conventional processes, the conversion of calcium hydrogen phosphate dihydrate to the phosphate anhydride, is performed by continuously feeding the dihydrate to a dehydration apparatus in which the dihydrate in the form of slurry is agitated at an elevated temperature. In this case, particle size of the anhydride depends on the duration of the agitation and the temperature at which the conversion is effected. As illustrated in FIGS. 3 and 4, mean particle size of the anhydride becomes larger as the agitation time is shortened and also as the conversion temperature is lowered. In FIGS. 3 and 4, the cross mark represents a case where the dihydrate slurry contained 1.4 g/l of $P_2O_5$, the triangular marks represent 3.5 g/l of $P_2O_5$ and the circles 7 g/l of $P_2O_5$. The crystal shape of the anhydride depends on the pH of the dihydrate slurry also in this case and tends to become diamond-shaped as the pH is lowered. When the conversion temperature is below 80° C., however, this method gives rectangular crystals of the anhydride irrespective of the pH of the slurry. To obtain diamond-shaped anhydride crystals of appropriate particle size by this method, therefore, the conversion needs to be conducted at temperature above 85° C. with the adjustment of the pH of the slurry to a value below 4.4. Compared with the conversion method according to the invention, this conversion method is disadvantageous in that the particle size of the anhydride can be varied only in such a narrow range that mean particle size cannot be made larger than about 11 $\mu$m particularly when the particle shape is specified and hence the conversion temperature is fixed.

Another conventional method of converting calcium hydrogen phosphate dihydrate to the anhydride is a batch process, in which a batch of aqueous slurry of the dihydrate is prepared at a temperature around room temperature, and, after adjustment of pH by the addition of a mineral acid, the slurry is heated to an intended conversion temperature. In this case, particle size of the anhydride varies over a wide range depending on the conversion temperature, the length of the time needed to raise the temperature of the slurry (rate of heating) and pH of the slurry. Since the pH of the slurry needs to be determined according to an intended Ca/P mole ratio or particle shape of the anhydride, the particle size must be controlled by the choice of only the conversion temperature and the rate of heating. FIG. 5 illustrates variations in mean particle size of the anhydride depending on the conversion conditions in this method. The white circles represent a temperature rise of the dihydrate slurry to 82°–83° C. in 2–3 min. The triangles represent a temperature rise of the slurry to 82°–83° C. in 4–5 min. The cross marks represent a temperature rise of the slurry to 82°–83° C. in 6–8 min. The black circles represent a temperature rise of the slurry to 95° C. in 3 min. This graph shows the necessity of strictly controlling the rate of temperature rise to obtain the anhydride in a desired particle size such as 10 μm. In practice, it is not easy to optionally vary the rate of temperature rise with precision.

EXAMPLE 1

A 20% aqueous solution of SAP was prepared by the use of SAP derived from wet process phosphoric acid and refined by recrystallization. Calcium chloride was added to this solution in the proportion of 1 g $CaCl_2$ to 100 g SAP solution (the Ca/P mole ratio was 0.095) to cause precipitation of a small quantity of calcium hydrogen phosphate, and the precipitate was removed from the solution. This treatment reduced the Fe content of the SAP from 1.5 ppm to 0.2 ppm. Separately, calcium chloride obtained in a soda ash process was dissolved in water to give a 40% solution, and SAP was added to this solution in the proportion of 0.5 g $NaNH_4HPO_4.4H_2O$ to 100 g $CaCl_2$ solution (the P/Ca mole ratio was 0.0066) to cause precipitation of a small quantity of calcium hydrogen phosphate. By removing the precipitate from the solution, the Fe content of the calcium chloride was reduced from 0.65 ppm to 0.1 ppm.

Thereafter the calcium chloride solution was diluted with water until the concentration of $CaCl_2$ became 50 g/l, and 40 liters of the diluted calcium chloride solution was charged in a stainless steel reaction vessel which was 100 liters in capacity. The purified SAP solution was diluted with water to give a solution containing 15 g of $P_2O_5$ per liter. This SAP solution was heated to 30° C. and showered into the calcium chloride solution in the reaction vessel with agitation. The reaction between SAP and calcium chloride was completed by continuing agitation for 70 min, maintaining the temperature at about 30° C., and the precipitated $CaHPO_4.2H_2O$ was separated from the mother liquor by filtration, followed by washing with water.

In a 3-liter stainless steel vessel provided with a stirrer, 1500 g of acidified water containing 25 g/l of $HNO_3$ was maintained at a temperature of 95° C. The pH of this hot water was 2.8. With the stirrer in operation, 900 g of the phosphate dihydrate obtained by the above described process was put into this hot water all at once. Stirring of the resultant slurry was continued for a certain length of time to cause conversion of the phosphate dihydrate to $CaHPO_4$. The temperature of the slurry during stirring was 83° C. This operation was carried out in several batches with variations of the stirring rate (350 rpm or 240 rpm) and the length of stirring time (0.5 to 2 min at 350 rpm, 0.5 to 4 min at 240 rpm). In the above explained FIG. 1, curves B and C represent the dependence of mean particle size of the phosphate anhydride crystals obtained in this example on the stirring conditions.

Figure 6:
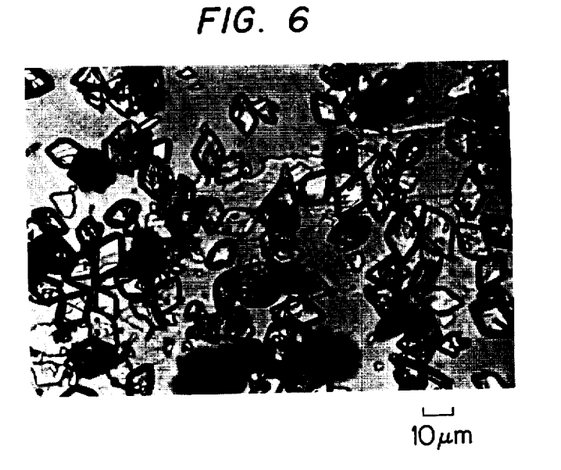
FIGS. 6, 7, 18 and 19 are micrographs of calcium hydrogen phosphate anhydride crystals prepared by a process according to the invention.

In this example, the conversion of the phosphate dihydrate to the anhydride proceeded without forming a gel phase. The crystals of the phosphate anhydride obtained in this example were platy and had a lozenge shape as seen in the micrograph of FIG. 6, and the Ca/P mole ratio of the phosphate anhydride was 1.008.

EXAMPLE 2

Figure 7:
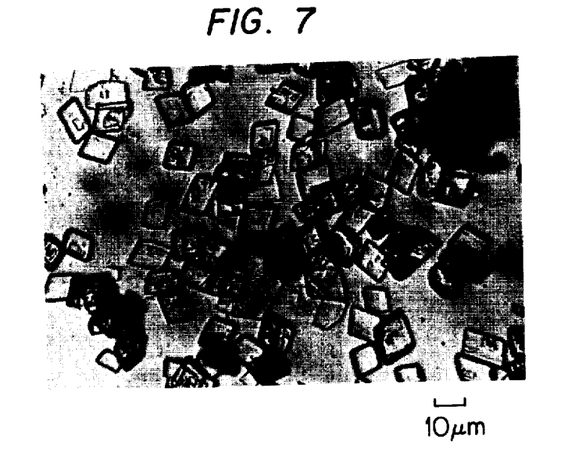

Example 1 was repeated except that the hot acidified water for the preparation of the phosphate dihydrate slurry contained only 0.9 g/l of $HNO_3$ to have a pH value of 4.5 and that the slurry temperature during stirring was 95° C. (meaning that the initial temperature of the acidified water was above 95° C.). The rate of stirring was 350 rpm, and the duration of the stirring was 0.25 to 2 min. In this example the conversion of the phosphate dihydrate to the anhydride proceeded through formation of a gel phase. In FIG. 1, curve A represents the result of changes of stirring conditions in this example. The phosphate anhydride crystals obtained in this example were platy and parallelogram-shaped as seen in the micrograph of FIG. 7, and the Ca/P mole ratio of this product was 1.019.

COMPARATIVE EXPERIMENT 1

Figure 8:
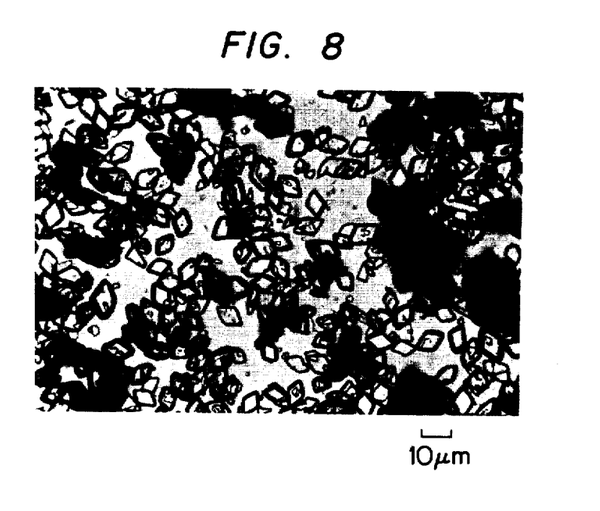
FIG. 8 is a micrograph of calcium hydrogen phosphate anhydride crystals prepared by a process not in accordance with the invention.

$CaHPO_4.2H_2O$ was prepared by the process of Example 1, and 1700 g of the phosphate dihydrate was dispersed in 15 liters of acidified water which contained 25 g/l of $HNO_3$ and was maintained in a 30-liter vessel at a temperature of about 50° C. After stirring for several minutes the phosphate dihydrate slurry was cahrged in a dehydration apparatus, in which the temperature of the slurry was raised almost instantaneously to 85° C., whereby the dihydrate was converted to the anhydride. The Ca/P mole ratio of the product was 1.008. In this experiment $CaHPO_4$ was obtained as lozenge-shaped platy crystals having a mean particle size of 7 μm as seen in the micrograph of FIG. 8.

However, it was practically imposile to obtain $CaHPO_4$ crystals larger than 10 μm by this method insofar as the crystals were required to be lozenge in shape and below 1.01 in Ca/P mole ratio.

To obtain $CaHPO_4$ practically free of Fe and Na by a process according to the invention, it is desirable that $CaHPO_4.2H_2O$ be prepared with little Fe and Na contained therein. The hereinbefore described pretreatment of SAP and calcium chlorine each in solution for removal of Fe is quite effective for reducing the Fe content of the phosphate dihydrate precipitated according to the invention. As to the Na content of the phosphate dihydrade, we have recognized and confirmed that reaction conditions for the precipitation of the phosphate dihydrate influence the Na content of the precipitate and that an exceedingly low Na content of the phosphate dihydrate can be realized by starting the reaction between SAP and calcium chloride solutions in the presence of crystalline calcium hydrogen phosphate dihydrate as seed crystals in an amount corresponding to 5–30% by weight of the phosphate dihydrate to be formed by the reaction. Aside from the use of seed crystals, relatively low concentrations of SAP and calcium chloride solutions, a relatively long reaction time and a relatively high reaction temperature are favorable to the reduction of the Na content of the phosphate dihydrate. The pH of the reaction system has little influence on the Na content of the product.

Figure 9:
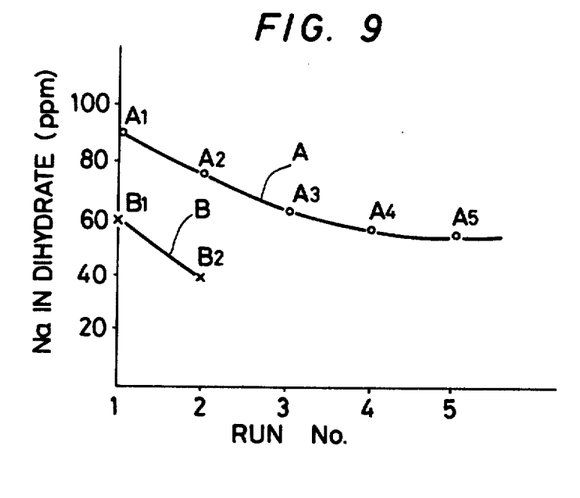
FIGS. 9–14 are graphs showing variations in sodium content of calcium hydrogen phosphate dihydrate depending on reaction conditions during synthesis.

FIG. 9 shows the effects of the reaction time and the use of seed crystals on the Na content of the precipitated $CaHPO_4.2H_2O$. Curve A represents the result of the following experiment. In the first Run indicated at $A_1$, $CaHPO_4.2H_2O$ was precipitated by the addition of a SAP solution to a calcium chloride solution without using seed crystals and completing the reaction in 70 min. In the next Run indicated at $A_2$, the mixing of the SAP and calcium chloride solutions was preceded by the addition of $CaHPO_2.2H_2O$ (Na:90 ppm) obtained in Run No. 1 to the calcium chloride solution as seed crystals. In Run No. 3 indicated at $A_3$, the phosphate dihydrate (Na:75 ppm) precipitated in Run No. 2 was used as seed crystals. The phosphate dihydrate precipitated in Run No. 3 ($A_3$) was used as seed crystals in Run No. 4, and the precipitate in Run No. 4 was used as seed crystals in Run No. 5 ($A_5$). In each Run, the quantity of the seed crystals corresponded to 25% of the phosphate dihydrate to be formed in each Run. The curve B represents the result of a similar experiment in which the reaction time was prolonged to 180 min.

Figure 10:
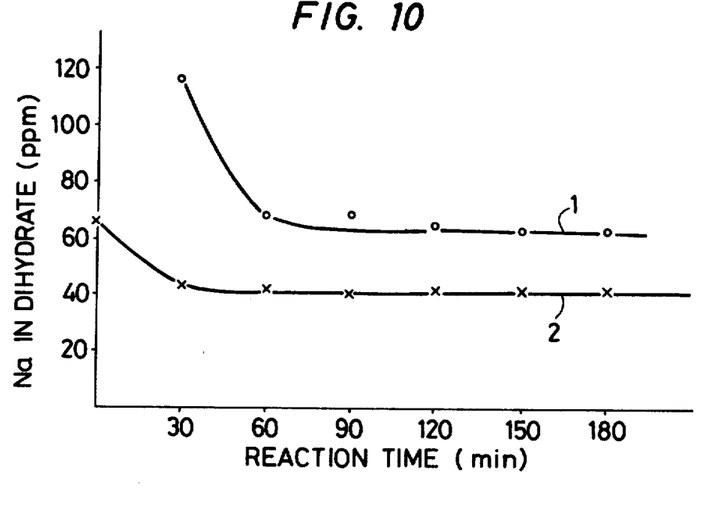

In FIG. 10, the curve 1 represents the result of an experiment in which a SAP solution ($P_2O_5$:30 g/l) was mixed with a calcium chloride solution ($CaCl_2$:50 g/l) without using seed crystals. The curve 2 represents the effect of the use of seed crystals ($CaHPO_4.2H_2O$ containing 66 ppm of Na) in a quantity corresponding to 25% of the phosphate dihydrate to be formed by the reaction between the SAP and calcium chloride solutions.

Figure 11:
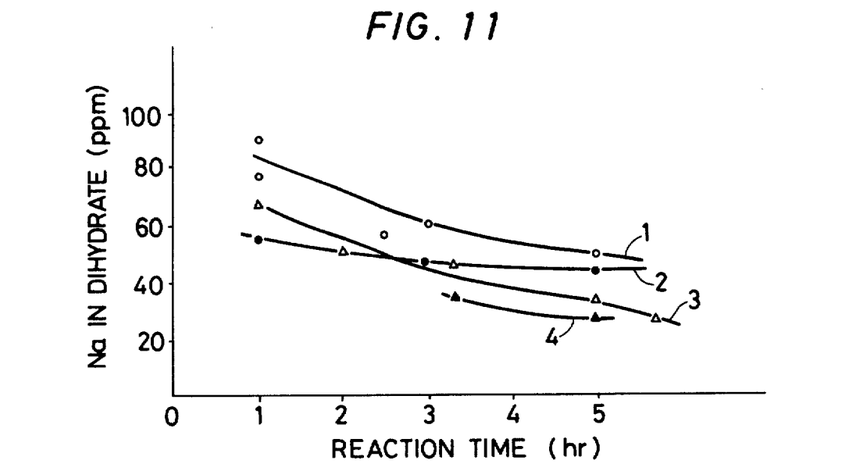
Figure 12:
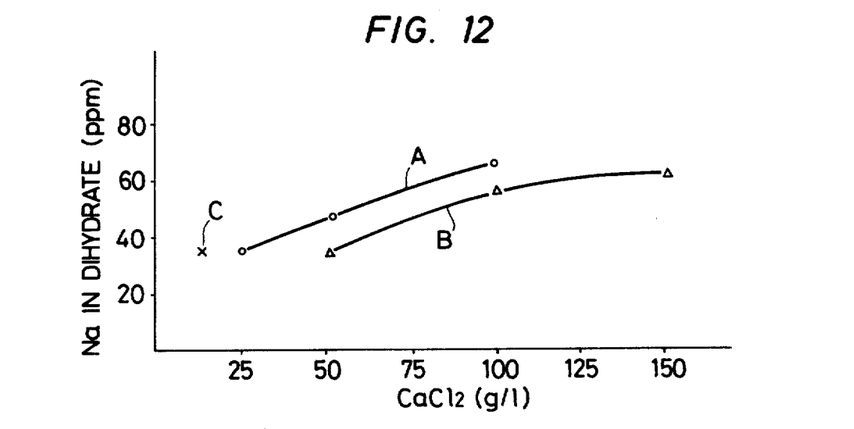

FIG. 11 shows the influence of the reaction time (duration of agitation of the reaction system) on the Na content of the precipitated phosphate dihydrate. Using a calcium chloride solution containing 50 g/l of $CaCl_2$, the curves 1 and 2 represent the use of a SAP solution whose concentration on the basis of $P_2O_5$ was 30 g/l and the curves 3 and 4 another SAP solution containing 15 g/l of $P_2O_5$. The curves 1 and 3 were obtained without using seed crystals and the curves 2 and 4 represent the use of seed crystals ($CaHPO_4.2H_2O$) in a quantity corresponding to 25% of the expected precipitate. FIG. 12 shows the dependence of the Na content of the phosphate dihydrate on the concentrations of SAP and calcium chloride solutions. The curves A and B represent 30 g/l of $P_2O_5$ and 15 g/l of $P_2O_5$, respectively, and the point C 50 g/l of $P_2O_5$.

Figure 13:
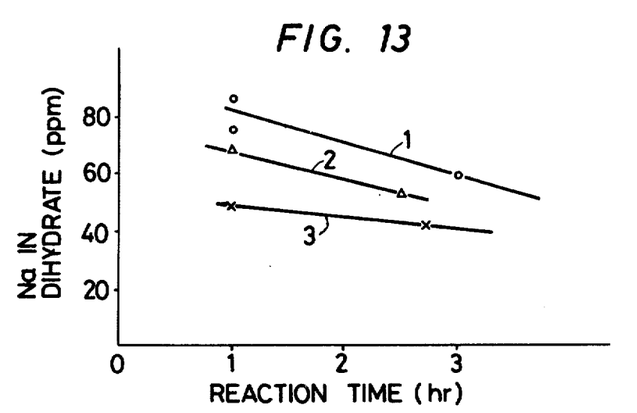

FIG. 13 shows variations in the Na content of the phosphate dihydrate depending on the reaction time and reaction temperature which was 25° C. for the curve 1, 30° C. for the curve 2 and 35° C. for the curve 3. It is apparent that the Na content can be reduced by raising the reaction time. However, it is undesirable to employ a reaction temperature above 40° C. because of a tendency of formation pf apatite. Preferably precipitation of the phosphate dihydrate is effected at temperatures between room temperature and 35° C.

Figure 14:
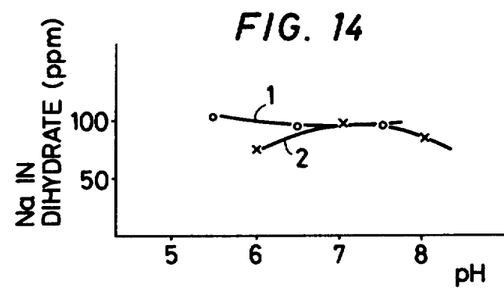

When the pH of the reaction system was varied by the addition of phosphoric acid to the SAP solution, the dependence of the Na content of the phosphate dihydrate was insignificant as seen in FIG. 14, wherein the curves 1 and 2 were obtained when the reaction time was 60 min and 70 min, respectively.

Considering the above explained relations, it is preferable to precipitate the phosphate dihydrate under the following conditions for minimizing the Na content of the product.

Concentration of calcium chloride solution: below 70 g/l as $CaCl_2$

Concentration of SAP solution: below 50 g/l on the basis of $P_2O_5$

Reaction time: at least 3 hours, more preferably at least 5 hours

Reaction temperature: room temperature to 35° C., more preferably room temperature to 30° C.

pH of the reaction system: 4–5 at the end of the reaction.

As described hereinbefore, the presence of seed cyrstals amounting to 5–30% of the phosphate dihydrate to be precipitated (at the start of the reaction) is highly effective for minimization of the Na content of the product.

Figure 15:
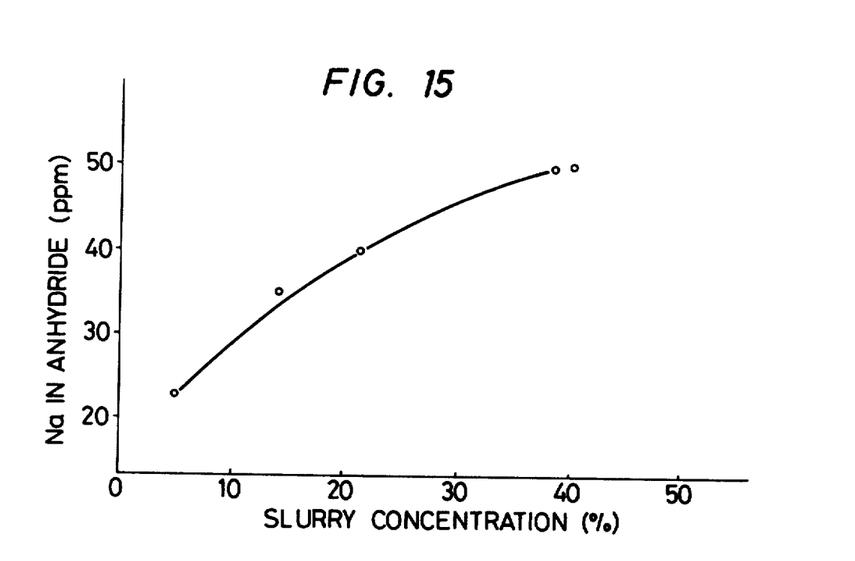
FIGS. 15–17 are graphs showing variations in sodium content of calcium hydrogen phosphate anhydride depending on dehydration conditions in a process according to the invention.
Figure 16:
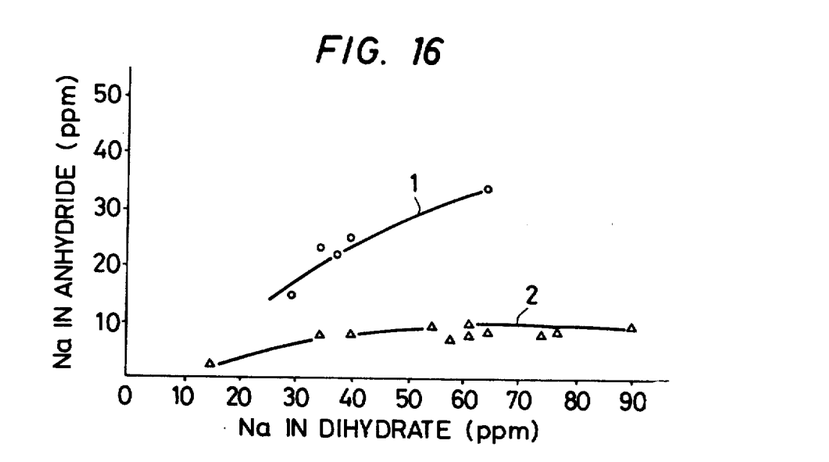

The Na content of the phosphate anhydride prepared by a process according to the invention is affected to a certain extent also by the concentration of the phosphate dihydrate slurry resulting from the one-shot addition of the dihydrate to a hot acidified water. The Na content of the anhydride lowers as the concentration of the dihydrate slurry lowers as deomonstrated by the curve of FIG. 15, showing the result of the use of an acidified water containing 13.7 g/l of $HNO_3$ and maintained at 95° C. In practice, however, the dihydrate slurry concentration may not freely be lowered because a lowering of the slurry concentration means a decrease in the quantity of the anhydride obtained in a batch. FIG. 16 shows the dependence of the Na content of the phosphate anhydride on the Na content of the dihydrate with respect to two different concentrations of the dihydrate slurry: the curve 1 represents 36 Wt% dihydrate slurry and the curve 2 represents 10 Wt% dihydrate slurry. The hot acidified water for the preparation of the 36% slurry contained 25 g/l of $HNO_3$ and was maintained at 95° C. The hot acidified water for the 10% slurry had the same temperature but contained only 1 g/l of $HNO_3$. This graph, too, shows the advantage of a relatively low concentration of the dihydrate slurry, but the employment of a very low slurry concentration such as 10% is not a requisite to a process of the invention since the Na content of the phosphate anhydride can be reduced by precipitating the phosphate dihydrate under the above described conditions. From these considerations, the concentration of the dihydrate slurry for dehydration should be below 40 Wt%.

Figure 17:
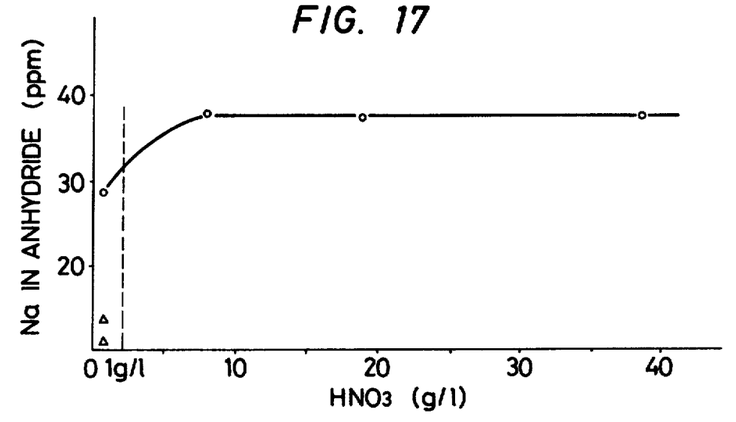

FIG. 17 shows the relation between the acid concentration, i.e. pH, of the hot water used for the conversion of the phosphate dihydrate to the anhydride and the Na content of the obtained anhydride. The temperature of the water was 95° C., and the dihydrate slurry concentration was 38 Wt%. This graph shows that the Na content lowers when the acid concentration of the water is low. However, the acid concentration or pH of the hot water cannot freely be varied with the object of reducing the Na content of the anhydride since the pH of the hot water needs to be determined according to the desired shape of the anhydride crystals. In FIG. 17, the Na content of the anhydride became as represented by the rectangular marks when the dihydrate slurry concentration was lowered to 10 Wt%. As described hereinbefore, the conversion of the dihydrate to the anhydride by the conversion method according to the invention proceeds through formation of a gel phase when the acid concentration of the hot water is below 1 g/l (in the case of $HNO_3$). The gel formation is considered to be a primary reason for the low values for the Na content observed at the 0.9 g/l acid concentration in FIG. 17. Also in the case of FIG. 16, the curve 2 represents the result of the conversion through formation of a gel phase.

EXAMPLE 3

The SAP used in Example 1 was dissolved in water to give a 20% solution. Calcium chloride was added to this solution in the proportion of 0.5 g $CaCl_2$ to 100 g solution (the Ca/P mole ratio was 0.047) to cause precipitation of a small quantity of $CaHPO_4.2H_2O$, and the precipitate was removed from the solution. By this treatment the Fe content of the SAP was reduced from 1.5 ppm to 0.2 ppm. Separately, calcium chloride obtained in a soda ash process was dissolved in water to give a 40% solution, and SAP was added to this solution in the proportion of 0.5 g $NaNH_4HPO_4.4H_2O$ to 100 g solution (the P/Ca mole ratio was 0.0066) to cause precitation of a small quantity of calcium hydrogen phosphate dihyrate. By removing the precipitate from the solution, the Fe content of the calcium chloride was reduced from 0.65 ppm to 0.1 ppm.

Thereafter the calcium chloride solution was diluted with water until the concentration of $CaCl_2$ became 25 g/l, and the pH of the solution was adjusted to 7 by the addition of 35% hydrochloric acid. This calcium chloride solution was charged in a 100-liter stainless steel reaction vessel, and crystalline calcium hydrogen phosphate dihydrate was added to the solution in a quantity corresponding to 25% of calcium hydrogen phosphate dihydrate to be obtained from this solution. The purified SAP solution was diluted with water (about 30° C.) to give a solution containing 30 g/l of $P_2O_5$ and then added with 85% phosphoric acid to adjust the pH to 7.1. This SAP solution was sprayed into the calcium chloride solution in the reaction vessel with agitation. The reaction between SAP and calcium chloride was completed by continuing agitation for 5 hr, maintaining the temperature at 30° C., and thereafter the reaction system was allowed to stand for a while. Then the precipitated phosphate dihydrate was separated from the mother liquor by filtration and washed by repulping using a sufficiently large quantity of deionized water. The repulping was repeated once more. The Fe content of the obtained phosphate dihydrate was 0.32 ppm and the Na content was 20 ppm.

Figure 18:
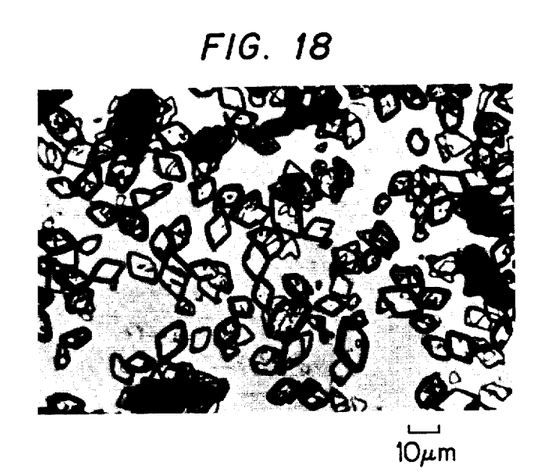

In a vessel provided with a stirrer, 1500 g of acidified water containing 25 g/l of $HNO_3$ was maintained at a temperature of 95° C. With the stirrer in operation, a batch of the phosphate dihydrate was put into this hot water all at once so as to give a slurry containing 36% by weight of the phosphate dihydrate. By continuing the stirring for several minutes the phosphate dihydrate was converted to the phosphate anhydride. As seen in FIG. 18, the phosphate anhydride obtained in this example was platy and lozenge-shaped crystals. The Fe content of the anhydride was 0.5 ppm and the Na content was 10 ppm.

EXAMPLE 4

Figure 19:
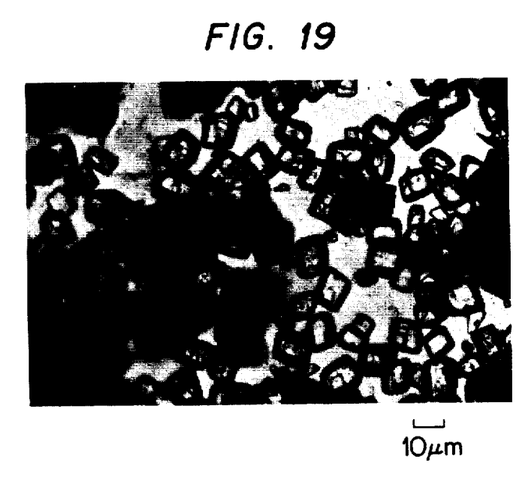

Example 3 was repeated except that the $HNO_3$ concentration of the hot acidified water was lowered to 1 g/l and that the dihydrate was put into the water in such a quantity that the concentration of the resultant slurry was 10% by weight. In this example the phosphate anhydride was obtained in the form of platy and rectangular crystals as seen in FIG. 19. The Fe content of the anhydride was 0.3 ppm and the Na content was 3 ppm.

COMPARATIVE EXPERIMENT 2

The starting materials were those used in Example 3. The removal of Fe from SAP and calcium chloride was performed generally in accordance with Example 3, but the amount of calcium chloride added to the SAP solution was 0.1 g (as $CaCl_2$) per 100 g solution (the Ca/P mole ratio was 0.0094) and the amount of SAP added to the calcium chloride solution was 0.2 g (as $NaNH_4HPO_4.4H_2O$) per 100 g solution (the P/Ca mole ratio was 0.00267). The Fe content of the treated SAP was 0.9 ppm and the Fe content of the treated calcium chloride was 0.45 ppm.

The synthesis of the phosphate dihydrate was performed in the same manner as in Example 3 except that the duration of agitation of the reaction system was 2 hr. The Fe content of the obtained phosphate dihydrate was 1.60 ppm and the Na content was 50 ppm.

The conversion of the phosphate dihydrate to the anhydride was performed in exact accordance with Example 3. The anhydride was obtained in the form of platy and lozenge-shaped crystals. The Fe content of the anhydride was 2.5 ppm and the Na content was 28 ppm.

COMPARATIVE EXPERIMENT 3

The phosphate dihydrate was prepared in accordance with Comparative Experiment 2.

The conversion of the phosphate dihydrate to the anhydride was performed in exact accordance with Example 4. The anhydride was obtained in the form of platy and rectangular (nearly square) crystals. The Fe content of the anhydride was 1.5 ppm and the Na content was 8 ppm.

What is claimed is:

1. A process of preparing calcium hydrogen phosphate anhydride suitable as a raw material for phosphate phosphors, the process comprising the steps of:
    (a) adding a water soluble calcium salt to an aqueous solution of sodium ammonium hydrogenphosphate in such an amount that the Ca/P mole ratio in the resultant solution becomes 0.01–0.10 thereby to cause precipitation of a small quantity of calcium hydrogen phosphate dihydrate;
    (b) removing the precipitate from the resultant solution thereby to lower the content of Fe of said sodium ammonium hydrogenphosphate;
    (c) preparing an aqueous solution of sodium ammonium hydrogenphosphate treated in steps (a) and (b) so a to contain less than 50 g/l of $P_2O_5$;
    (d) adding a water soluble phosphate to an aqueous solution of calcium chloride in such an amount that the P/Ca mole ratio in the resultant solution becomes 0.005-0.05 thereby to cause precipitation of a small quantity of calcium hydrogen phosphate dihydrate;
    (e) removing the precipitate from the resultant solution thereby to lower the content of Fe of said calcium chloride;
    (f) preparing an aqueous solution of calcium chloride treated in steps (d) and (e) so as to contain less than 70 g/l of $CaCl_2$;
    (g) mixing said solution prepared in step (c) with said solution prepared in step (f) at temperatures between 5° C. and 40° C.;
    (h) separating the precipitated calcium hydrogen phosphate from solution;

(i) preparing an acidified water containing a mineral acid selected from the group consisting of nitric acid, hydrochloric acid and phosphoric acid in such an amount that the pH of said water is in the range from 1.0 to 5.0;

(j) maintaining said acidified water at a temperature above 80° C.;

(k) putting a batch of the calcium hydrogen phosphate dihydrate separated from said solution into said acidified water maintained at said temperature all at once to form a hot aqueous slurry of calcium hydrogen phosphate dihydrate in a concentration below 40% by weight; and (l) agitating said hot slurry thereby to convert said calcium hydrogen phosphate dihydrate in said slurry to crystalline calcium hydrogen phosphate anhydride.

2. A process as claimed in claim 1, further comprising the step of adding crystalline calcium hydrogen phosphate dihydrate as seed crystals to one of said solution prepared in step (c) and said solution prepared in step (f) prior to step (g), the amount of said seed crystals corresponding to 5 to 30% of calcium hydrogen phosphate dihydrate to be precipitated in step (g).

3. A process as claimed in claim 1, wherein said calcium salt is calcium chloride and said water soluble phosphate is sodium ammonium hydrogenphosphate.

4. A process as claimed in claim 1, wherein the mixing of solutions in step (g) is performed with agitation and is contained at least for 3 hours.

5. A process as claimed in claim 1, wherein the mixing of solutions in step (g) is accomplished by showering said solution prepared in step (c) into said solution prepared in step (f).

* * * * *